Dec. 11, 1934.  W. J. COULTAS  1,983,522
OIL SEAL
Filed Dec. 30, 1932
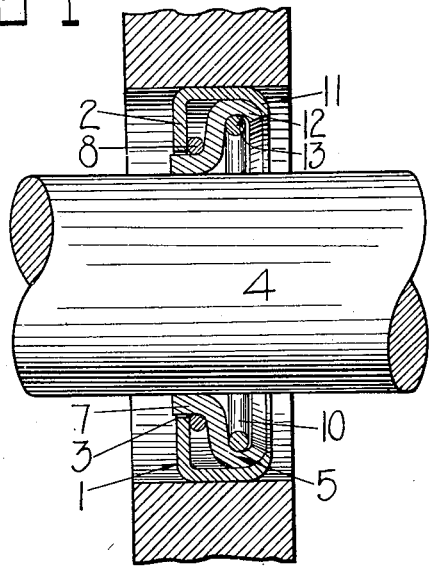
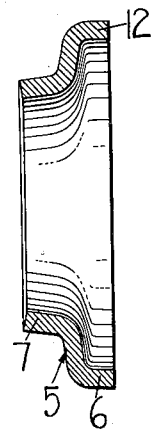
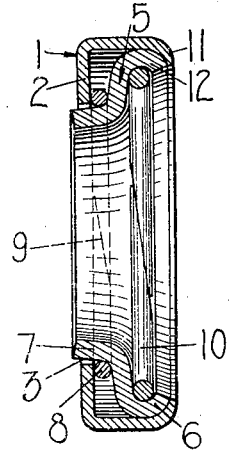 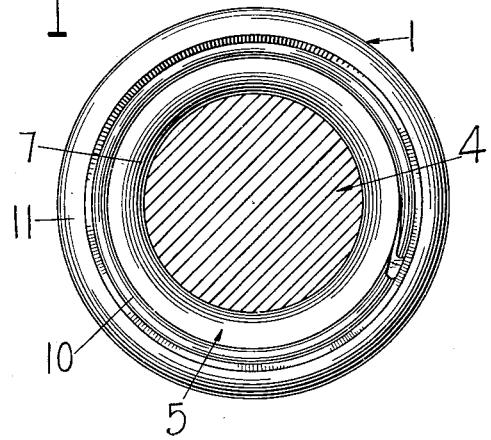
INVENTOR.
WILBUR J COULTAS.
WITNESS.
Edward Melin.
BY
W. E. Johnston
ATTORNEY.

Patented Dec. 11, 1934

1,983,522

UNITED STATES PATENT OFFICE 1,983,522

OIL SEAL

Wilbur J. Coultas, Moline, Ill., assignor to Deere & Company, Moline, Ill., a corporation of Illinois Application December 30, 1932, Serial No. 649,501

3 Claims. (Cl. 288—1)

My invention relates to oil seals employed on rotatable shafts to prevent exudation of oil, or other lubricating material, over the surface of a shaft from a housing or bearing, and the object of my invention is to provide an economical device, simple in construction and fully effective in the operation for which it is utilized.

Referring to the drawing in which similar numerals indicate identical parts—

Figure 1 is a section through a housing showing my improved seal in position on the shaft, within the housing and in section;

Figure 2 is a diametrical section of the seal;

Figure 3 is a view of the seal and shaft, the latter shown in transverse section; and, Figure 4 is a section of the leather packing illustrating the form thereof prior to use.

The seal illustrated is composed of the following elements, a cup-shaped cage 1 made of sheet metal stamped or spun to form and having a disc-like base 2 in which is a central aperture 3 for passage of a shaft 4 therethrough. A bell-shaped packing 5, illustrated in Fig. 4, and made of leather or other suitable material, is placed within the cage 1; the cylindrical part 6 of the packing is of the same diameter as the inside of the cage and fits closely therein; the conical part 7 of the packing projects through the aperture 3 and slightly out of contact with the edge of the aperture. A circular spring 8 surrounds the conical part of the packing within the cage 1 adjacent the base 2, and is severed diagonally as at 9.

A circular spring 10 is within the part 6 of the packing, the expansive force of the spring pressing the cylindrical part 6 of the packing firmly against the similar part of the cage 1, the spring 10 being severed diagonally and contracted as it is placed in position. To hold the packing within the cage the rim 11 is bent inwardly toward the center, and as the rim is bent the rim 12 of the packing is similarly bent by the expansive force of the spring 10 thereby forming a groove or channel 13 in the packing in which the spring 10 is operatively held, the pressure of the spring ensuring a fluid tight contact of the packing with the rim 11.

With the parts assembled, as shown in the drawing, and in position in the housing and about the shaft, it is readily evident that when the shaft is passed through the conical part 7 of the packing 5, the latter, because of the greater diameter of the shaft, is expanded into a fluid tight contact with the shaft, the contact being reinforced by the constricting action of the spring 8, consequently leakage of oil or grease along the shaft is effectively prevented; the expansive force of the spring 10 also efficiently operating to prevent passage of lubricating material between the bent rims of the cage 1 and the packing.

I claim:

1. In a seal of the character described, the combination of a one-piece cup-shaped cage having a flat cylindrical portion, the peripheral edge of said portion turned toward the center of the cage, a disc-like base to the cage, a central aperture in said disc for passage of a shaft, a bell-shaped packing within said cage having its greater diameter coincident with the inner diameter of the cage, a conical portion of said packing extending to said aperture in close surrounding contact with the shaft, a spring within the packing at the greater diameter thereof and operating with expansive force to press the packing in fluid tight contact with the flat cylindrical portion of the cage and the inturned peripheral edge thereof and a spring surrounding the packing at the smaller diameter thereof and confined in the space between the conical portion of the packing and the base of the cage and operating with contractive force to press the packing in fluid tight contact with the shaft.

2. In a seal of the character described, the combination of a one-piece cup-shaped cage having a flat cylindrical portion, the peripheral edge of said portion turned toward the center of the cage, a disk-like base to the cage, a central aperture in said disk for the passage of a shaft, a packing within said cage having two cylindrical portions of different diameters connected by an intermediate portion, the portion of greater diameter being coincident with the inner diameter of the cage and the portion of lesser diameter extending toward said aperture in close surrounding contact with the shaft, a spring within the packing and bearing against the inner periphery of the portion of greater diameter and operating with expansive force to place the latter portion in fluid-tight contact with the cylindrical portion of the cage and the inturned peripheral edge thereof, and a second spring surrounding the portion of the packing of smaller diameter and confined in the space between the intermediate portion of the packing and the base of the cage and operating with contractive force to place the packing in fluid-tight contact with the shaft.

3. In a seal of the character described, the combination of a one-piece cup-shaped cage having a flat cylindrical portion, the peripheral edge of said portion turned toward the center of the cage, a disk-like base to the cage, a central aperture in said disk for the passage of a shaft, a packing within said cage having two cylindrical portions of different diameters connected by an intermediate portion, the portion of greater diameter being coincident with the inner diameter of the cage and the portion of lesser diameter disposed in close surrounding contact with the shaft, a spring within the packing and bearing against the inner periphery of the portion of greater diameter and operating with expansive force to place the latter portion in fluid-tight contact with the cylindrical portion of the cage and the inturned peripheral edge thereof, and a second spring surrounding the portion of the packing of smaller diameter and operating with contractive force to place the packing in fluid-tight contact with the shaft.

WILBUR J. COULTAS.